UNITED STATES PATENT OFFICE.

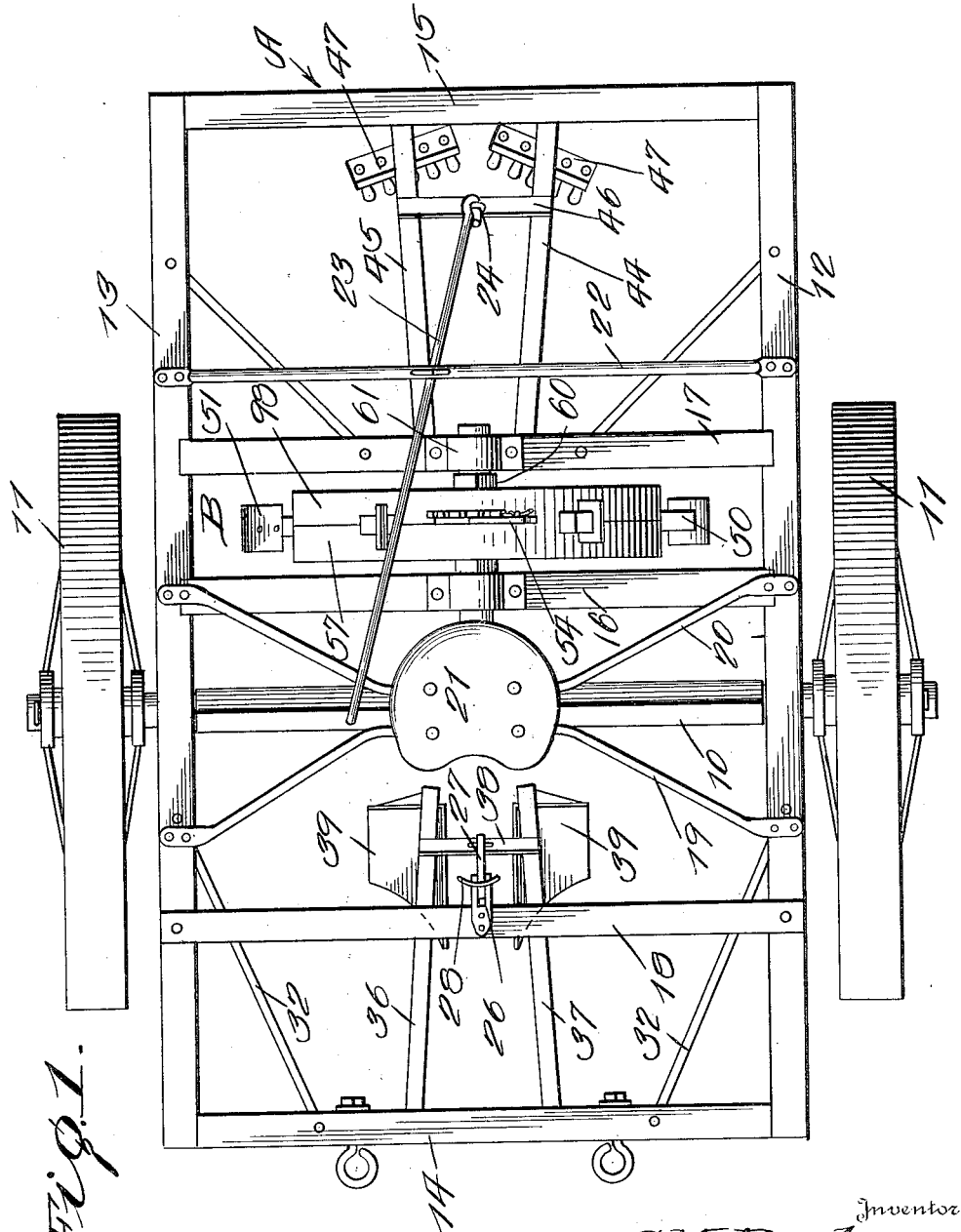

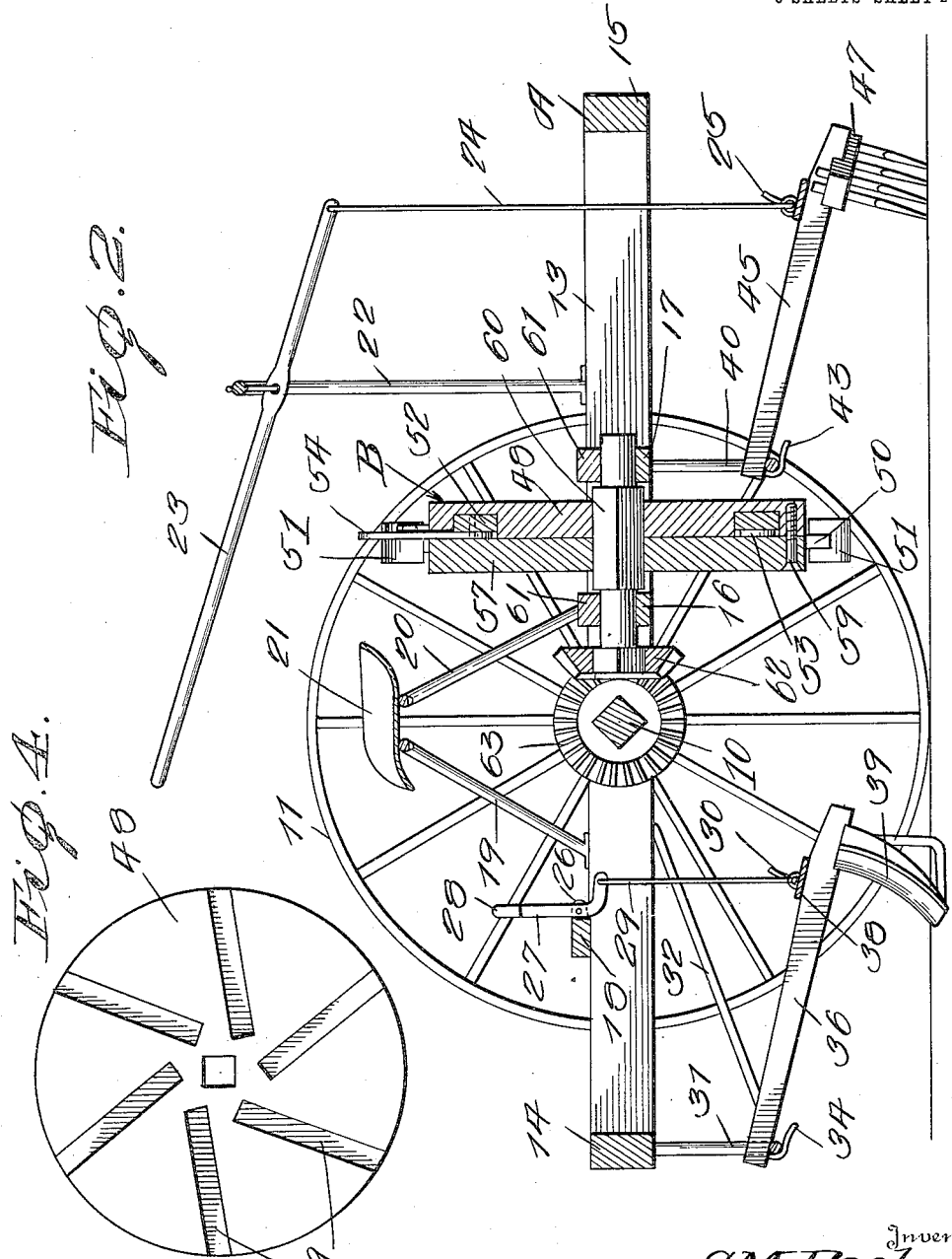

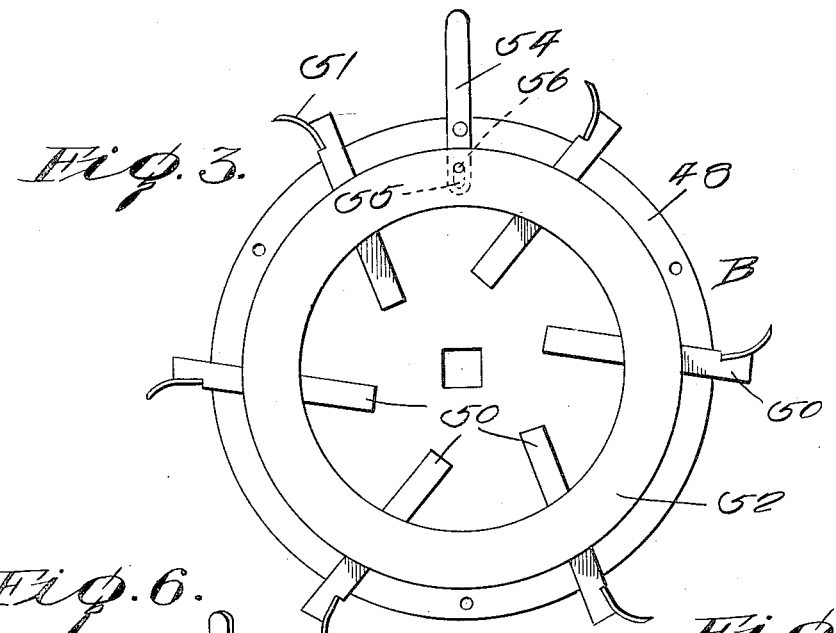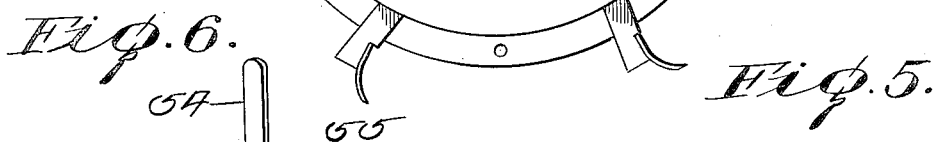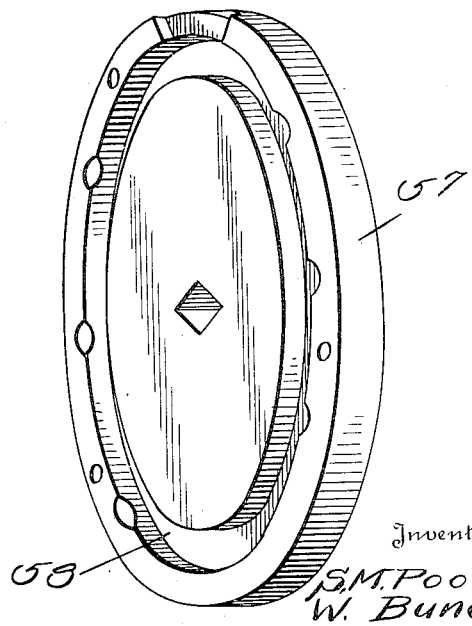

SAMUEL M. POOL AND WILLIAM BUNCH, OF AURORA, MISSOURI.

COTTON-CHOPPER.

1,134,060.  Specification of Letters Patent.  Patented Mar. 30, 1915.

Application filed January 21, 1914. Serial No. 813,563.

*To all whom it may concern:*

Be it known that we, SAMUEL M. POOL and WILLIAM BUNCH, citizens of the United States, residing at Aurora, in the county of Lawrence, State of Missouri, have invented certain new and useful Improvements in Cotton-Choppers; and we do hereby declare the following to be a full, clear, and exact description of the invention, such as will enable others skilled in the art to which it appertains to make and use the same.

This invention relates to cotton choppers.

The object of the invention resides in the provision of a cotton chopper which embodies a rotary cutter and cultivating elements adapted to cultivate the plants simultaneously with the thinning thereof by means of the rotary cutter.

A further object of the invention resides in the provision of a cotton chopper including a rotary cutter in which the cutting elements may be adjusted radially to conform with the heights of the ridges in which the cotton plants are embedded.

A still further object of the invention resides in the provision of a cotton chopper which will be simple in construction, efficient in use and which may be manufactured at a comparatively small cost.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a cotton chopper constructed in accordance with the invention; Fig. 2, a longitudinal section of the improved cotton chopper; Fig. 3, a front view of the rotary cutter detached and with the face plate removed; Fig. 4, a front view of the base plate of the rotary cutter; Fig. 5, a perspective view looking at the inner side of the face plate of the rotary cutter; and Fig. 6, a perspective view of the operating ring of the rotary cutter with the cutter stems attached thereto.

Referring to the drawings the improved cotton chopper is shown as comprising an axle 10 having fixed on the ends thereof traction wheels 11. Rotatably mounted on the axle 10 is a frame A which includes side members 12 and 13, a front member 14, and a rear member 15. The frame A further embodies cross members 16 and 17 connecting the side members 12 and 13 at the rear of the axle 10. The side members 12 and 13 are also connected by a cross member 18 disposed forwardly of the axle 10. Supported upon the frame A are arches 19 and 20 which carry an operator's seat 21, said seat being disposed at the rear of the cross member 18. Carried by the frame A at the rear of the seat 21 is an arch 22 upon which is pivotally supported a lever 23 one end of which may be conveniently grasped from the operator's seat to effect the manipulation thereof. Depending from the end of the lever 23 remote from the operator's seat is a link 24 and the lower end of this link terminates in a hook 25 for a purpose that will presently appear. Mounted upon the cross member 18 is a bracket 26 upon which is pivoted an angle lever 27. One end of this lever 27 terminates in a pedal 28 whereby the lever may be conveniently moved on its pivot by the operator through the medium of movement of the foot. Depending from the other end of the angle lever 27 is a link 29 the lower end of which terminates in a hook 30 for a purpose that will presently appear.

Depending from the front member 14 is a U-shaped member 31 which is strengthened by means of braces 32. Mounted on the arm connecting portion of the U-shaped member 31 are spaced collars 33 and engaged with the arm connecting portion of the U-shaped member between the collars 33 are hooks 34 carried at the forward end of beams 36 and 37 respectively. These beams are connected together adjacent their rear ends by a bar 38 and said beams also carry rearwardly of the bar 38 cultivating shovels 39. The bar 38 is engaged by the hook 30 so that by operating the angle lever 27 the shovel 39 can be readily lifted out of engagement with the ground. Depending from the cross beam 17 is a U-shaped member 40. Mounted upon the arm connecting portion of the U-shaped member 40 are spaced collars 41 and engaged with the arm connecting portion of said U-shaped member between the collars 41 are hooks 43 carried at the forward ends of beams 44 and 45 respectively. These beams are connected together adjacent their rear ends by a bar 46 and said beams also carry rearwardly of the bar 38 harrow elements 47. The bar 46 is engaged by the hook 25 so that by operating the lever 23 the harrow elements 47 can be readily lifted out of engagement with the ground.

The rotary cutting element of the apparatus is journaled between the cross members 16 and 17 with its axis of rotation extending longitudinally of the apparatus. This cutting element is indicated generally at B and is shown as comprising a circular base plate 48 the rear face of which is provided with a plurality of grooves 49 opening through the periphery thereof, said grooves being correspondingly disposed with respect to the center of the base plate. Slidable in the grooves 49 respectively are cutter stems 50 which carry at their outer ends respectively cutters 51. It will be noted that the exposed faces of the stems 50 lie substantially flush with the rear face of the base plate. Disposed against the front face of the base plate is a ring 52, said ring being connected with respective cutter stems by means of links 53 pivoted to said ring 52 and stems 50. Pivoted upon the front face of the base plate 48 is a lever 54 one end of which extends beyond the periphery of the base plate, while the other end thereof is provided with a slot 55 in which is engaged a stud 56 carried by the ring 52. The rotary cutter B further embodies a face plate 57 having formed on its inner face an annular groove 58 which receives the ring 52. The face plate 57 is secured to the base plate 48 by means of screws 59. By this construction it will be obvious that when the lever 54 is moved in one direction the cutter stems 50 will be moved inwardly of the base plate, while opposite movement of the lever 54 will move said cutter stems outwardly of the base plate. In this manner the cutters 51 can be adjusted to conform with the height of the ridge in which the plants are embedded. The plates 48 and 57 are fixed upon a shaft 60 which is journaled in bearings 61 carried by the cross members 16 and 17. Fixed on the forward end of the shaft 60 is a beveled gear 62 which meshes with a beveled gear 63 fixed on the axle 10. By this construction it will be obvious that as the apparatus is drawn along the ground the axle 10 will be rotated and this rotation will be imparted to the cutter B with the result that the cutters 51 will remove the plants at intervals and thus effect the necessary thinning thereof.

What is claimed is:—

1. In a cotton chopper, a rotary head, a plurality of cutter stems slidably mounted in the head, cutters mounted on the outer ends of said stems respectively, a ring rotatably mounted in the head, connections between said ring and respective cutter stems whereby rotation of the ring will move said cutter stems radially of the head, and means for rotating said ring.

2. In a cotton chopper, a rotary head, a plurality of cutter stems slidably mounted in the head, cutters mounted on the outer ends of said stems respectively, a ring rotatably mounted in the head, connections between said ring and respective cutter stems whereby rotation of the ring will move said cutter stems radially of the head, and lever operated means for adjusting said cutters.

In testimony whereof, we affix our signatures, in the presence of two witnesses.

SAMUEL M. POOL.
WILLIAM BUNCH.

Witnesses:
K. HARTMAN,
CLARENCE KENNEY.

Copies of this patent may be obtained for five cents each, by addressing the "Commissioner of Patents, Washington, D. C."